Patented Jan. 12, 1954

2,666,065

UNITED STATES PATENT OFFICE 2,666,065

PREPARATION OF 2-ALKOXY-2-ALKYL-TETRAHYDROFURANS

Samuel Swadesh, Maywood, Ill., assignor to The Quaker Oats Company, Cook County, Ill., a corporation of New Jersey No Drawing. Application December 15, 1950, Serial No. 201,074

13 Claims. (Cl. 260—347.8)

This invention relates to the dihydrogenation of a 2-alkylfuran and more particularly to the preparation of 2-alkoxy - 2 - methyltetrahydrofurans by the dihydrogenation of 2-methylfuran. I have found that the foregoing products are useful among other things, as solvents and plasticizers and can be used as an intermediate in the preparation of other compounds.

I have discovered that by the dihydrogenation of 2-methylfuran in an alcoholic medium under acidic conditions and in the presence of a nickel catalyst a 2-alkoxy - 2 - methyltetrahydrofuran can be obtained according to the following general equation:

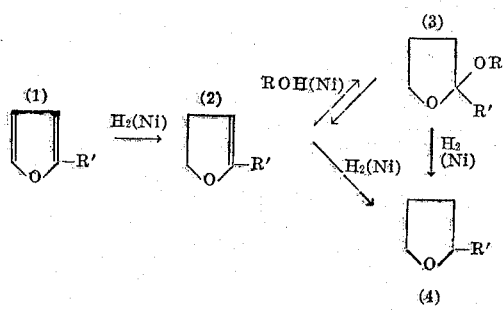

wherein R and R' may be the same or different and represent alkyl radicals. As the foregoing equation indicates, the dihydrogenation of a 2-alkylfuran or as a specific example where R' is methyl, 2-methylfuran (1) produces first the intermediate compound 2-methyl - 4,5 - dihydrofuran (2) which with alcohol produces 2-alkoxy-2-methyltetrahydrofuran (3) and on further hydrogenation produces 2-methyltetrahydrofuran (4). The actual quantity of the latter two compounds produced in the reaction is dependent upon the experimental conditions employed. Product (4) is formed by the dihydrogenation of product (2) in the presence of a nickel catalyst which condition is identical to that necessary for the production of product (2) from product (1). In fact, all experimental data indicate that it is easier to hydrogenate product (2) under these conditions than it is to hydrogenate product (1) to product (2). If, however, product (2) is hydrogenated in an alcoholic medium and under acidic conditions, product (3) is obtained. This latter reaction is reversible and in addition, product (4) is formed by the hydrogenolysis of product (3) in the presence of a nickel catalyst.

It is an object of the present invention to provide an efficient process for the preparation of a 2 - alkoxy-2-alkyltetrahydrofuran. Another object is to provide a process for the preparation of a 2-alkoxy - 2 - alkyltetrahydrofuran in a direct manner which can be easily carried out using relatively inexpensive equipment. A very important object is to provide an improved process for producing a 2-alkoxy-2-alkyltetrahydrofuran by dihydrogenating a 2-alkylfuran. Other objects and advantages of the present invention will become apparent to those skilled in the art as the invention is more fully described.

Broadly stated, the present invention provides a process for the production of a 2-alkoxy-2-alkyltetrahydrofuran which comprises dihydrogenating an alcoholic solution of a 2-alkylfuran in the presence of a nickel catalyst at elevated temperatures and under super-atmospheric pressures and acidic conditions. In view of the fact that the conditions: temperature, pressure, type and quantity of catalyst used, type and quantity of acid used as well as degree of agitation are all inter-dependent variables, the actual operating conditions vary widely. Generally, I prefer to operate within a temperature range of 100 to 200° C. and under a pressure of about 500 to 2000 pounds per square inch gauge. While formic acid is the preferred acid, other acids may be substituted in the process such as acetic, propanoic or any other organic acid of similar strength or even inorganic acids and acid salts which are sufficiently soluble in the alcoholic medium used.

In order to described the nature of the present invention still more thoroughly the following illustrations or examples will be given in which "parts by weight" bear the same relation to "parts by volume" as grams do to cubic centimeters.

EXAMPLE I

*Preparation of 2-methoxy-2-methyltetrahydrofuran*

About 82 parts by weight of freshly distilled 2-methylfuran in 100 parts by volume of methanol containing 0.06 part by volume of 98 per cent formic acid was reacted with hydrogen over reduced nickel on kieselguhr catalyst at about 160° C. and under a pressure of about 1600 pounds per square inch gauge of hydrogen. Hydrogen was absorbed smoothly and after approximately 2.5 hours, about 2 parts by weight had been absorbed. The reaction products were cooled, filtered, neutralized with normal sodium hydroxide, and distilled to give a yield of 13.2 parts by weight of 2-methoxy-2-methyltetrahydrofuran (boiling point 113–114° C. $n_D^{20}$ 1.4115) representing a yield of 11.4 per cent of theory based on the quantity of 2-methylfuran used.

| Analysis: $C_6H_{12}O_2$ | C | H | Mol. Wt. |
|---|---|---|---|
| Theory | 62.04 | 10.91 | 116 |
| Found | 62.02 | 10.47 | 115 |

Upon replacing the reduced nickel on kieselguhr catalyst with a Raney nickel catalyst similar results were obtained as follows:

About 82 parts by weight of freshly distilled 2-methylfuran in 100 parts by volume of methanol containing 0.6 part by volume of 98 per cent formic acid was reacted with hydrogen over Raney nickel catalyst at about 160° C. and under a pressure of about 1700 pounds per square inch gauge of hydrogen. Hydrogen was absorbed smoothly and after approximately 3 hours, about 2 parts by weight had been absorbed. The reaction products were cooled, filtered, neutralized with 0.5 n. sodium hydroxide, and distilled to give a yield of 8.2 parts by weight of 2-methoxy-2-methyltetrahydrofuran (boiling point 110–114° C., $n_D^{20}$ 1.4110) representing a yield of 7.1 per cent of theory based on the quantity of 2-methylfuran used.

EXAMPLE II

*Preparation of 2-butoxy - 2 - methyltetrahydrofuran*

About 82 parts by weight of freshly distilled 2-methylfuran in 100 parts by volume of n-butanol containing 0.06 part by volume of 98 per cent formic acid was reacted with hydrogen over reduced nickel on kieselguhr catalyst at about 160° C. and under a pressure of about 1600 pounds per square inch gauge of hydrogen. Hydrogen was absorbed smoothly and after approximately 70 minutes, about 2 parts by weight had been absorbed. The reaction products were cooled, filtered, neutralized with normal sodium hydroxide and distilled to give a yield of 16.1 parts by weight of 2-butoxy - 2 - methyltetrahydrofuran (boiling point 49–50° C. at 6 mm. $n_D^{20}$ 1.4233) representing a yield of 10.2 per cent of theory based on the quantity of 2-methylfuran used.

| Analysis: $C_9H_{18}O_2$ | C | H | Mol. Wt. |
|---|---|---|---|
| Theory | 68.31 | 11.47 | 158 |
| Found | 68.53 | 11.52 | 152 |

While the invention has been described in great detail in reference to the dihydrogenation of 2-methylfuran, other alkylfurans may be dihydrogenated in the same manner. In the examples, methyl and butyl alcohol have been used. These may be replaced by other aliphatic alcohols. For example, 2-ethoxy-2-methyltetrahydrofuran would be formed in Example I by substituting ethyl alcohol for the methyl alcohol. Likewise, 2-propoxy - 2 - methyltetrahydrofuran would be produced by substituting propyl alcohol for methyl alcohol. If instead of 2-methylfuran, 2-ethylfuran were used in Example I, 2-methoxy-2-ethyltetrahydrofuran would be formed. Such variations and modifications are considered to be within the purview and scope of the appended claims.

I claim:

1. A process for the production of a 2-alkoxy-2-alkyltetrahydrofuran which comprises the hydrogenation of a 2-alkylfuran at elevated temperatures and under super-atmospheric pressures in the presence of a nickel catalyst, a saturated aliphatic alcohol containing not more than 4 carbon atoms and an acid soluble in said alcohol.

2. A process for the production of a 2-alkoxy-2-methyltetrahydrofuran which comprises the hydrogenation of 2-methylfuran at elevated temperatures and under super-atmospheric pressures in the presence of a nickel catalyst, a saturated aliphatic alcohol containing not more than 4 carbon atoms and an acid soluble in said alcohol.

3. A process for the production of a 2-methoxy-2-alkyltetrahydrofuran which comprises the hydrogenation of a 2-alkylfuran at elevated temperatures and under super-atmospheric pressures in the presence of a nickel catalyst, methyl alcohol, and an acid soluble in said methyl alcohol.

4. A process for the production of 2-methoxy-2-methyltetrahydrofuran which comprises the hydrogenation of 2-methylfuran at elevated temperatures and under super-atmospheric pressures in the presence of a nickel catalyst, methyl alcohol, and an acid soluble in said methyl alcohol.

5. A process for the production of a 2-alkoxy-2-alkyltetrahydrofuran which comprises the hydrogenation of a 2-alkylfuran at a temperature of 100 to 200° C. and under a pressure of 500 to 2000 pounds per square inch gauge in the presence of a nickel catalyst, a saturated aliphatic alcohol containing not more than 4 carbon atoms and an acid soluble in said alcohol.

6. A process for the production of a 2-alkoxy-2-methyltetrahydrofuran which comprises the hydrogenation of 2-methylfuran at a temperature of 100° to 200° C. and under a pressure of 500 to 2000 pounds per square inch gauge in the presence of a nickel catalyst, a saturated aliphatic alcohol containing not more than 4 carbon atoms and an acid soluble in said alcohol.

7. A process for the production of 2-methoxy-2-methyltetrahydrofuran which comprises the hydrogenation of 2-methylfuran at a temperature of 100° to 200° C. and under a pressure of 500 to 2000 pounds per square inch gauge in the presence of a nickel catalyst, methyl alcohol and an acid soluble in said methyl alcohol.

8. The process of claim 3 wherein the acid used is formic acid.

9. The process of claim 4 wherein the acid used is formic acid.

10. The process of claim 7 wherein the acid used is formic acid.

11. A process for the production of a 2-butoxy-2-alkyltetrahydrofuran which comprises the hydrogenation of a 2-alkylfuran at elevated temperatures and under super-atmospheric pressures in the presence of a nickel catalyst, butyl alcohol and an acid soluble in said butyl alcohol.

12. A process for the production of 2-butoxy-2-methyltetrafuran which comprises the hydrogenation of 2-methylfuran at elevated temperatures and under super-atmospheric pressures in the presence of a nickel catalyst, butyl alcohol and formic acid.

13. A process for the production of 2-butoxy-2-methyltetrahydrofuran which comprises the hydrogenation of 2-methylfuran at a temperature of 100° to 200° C. and under a pressure of 500 to 2000 pounds per square inch gauge in the presence of a nickel catalyst, butyl alcohol and formic acid.

SAMUEL SWADESH.

References Cited in the file of this patent

UNITED STATES PATENTS

| Number | Name | Date |
|---|---|---|
| 2,033,292 | Lazier | Mar. 10, 1936 |

OTHER REFERENCES

Topchiev, Chem. Abstracts, vol. 32, p. 3411 (1938).